United States Patent [19]

McKelvey

[11] 4,226,608

[45] Oct. 7, 1980

[54] METHOD AND APPARATUS FOR CURVING GLASS SHEETS

[75] Inventor: Harold E. McKelvey, Plymouth, Mich.

[73] Assignee: Shatterproof Glass Corporation, Detroit, Mich.

[21] Appl. No.: 38,515

[22] Filed: May 14, 1979

[51] Int. Cl.² .............................................. C03B 23/02
[52] U.S. Cl. ........................................ 65/106; 65/104; 65/245; 65/253; 65/275; 65/273
[58] Field of Search ................ 65/104, 106, 107, 245, 65/273, 275, 253; 29/126

[56] References Cited

U.S. PATENT DOCUMENTS

| | | | |
|---|---|---|---|
| 3,485,618 | 12/1969 | Ritter, Jr. | 65/275 |
| 3,545,951 | 12/1970 | Nedelec | 65/107 X |
| 3,934,996 | 1/1976 | Frank | 65/245 X |
| 4,054,437 | 10/1977 | Ueberwolf et al. | 65/107 |
| 4,139,359 | 2/1979 | Johnson et al. | 65/253 X |

FOREIGN PATENT DOCUMENTS

| | | | |
|---|---|---|---|
| 836026 | 10/1938 | France | 29/126 |
| 2221409 | 12/1973 | France | 65/107 |

Primary Examiner—Arthur D. Kellogg
Attorney, Agent, or Firm—William E. Nobbe

[57] ABSTRACT

The flat glass sheet to be curved, which is at softening temperature, is advanced in a horizontal position on a curved bed formed by a series of flexible shaping rolls including coiled springs having progressively increasing degrees of curvature such that as the sheet moves thereon it will be caused to bend under its own weight to gradually assume the curvature of the shaping rolls. The shaping rolls are provided with end sections which are angularly adjustable to independently alter the degree of curvature of the rolls. The shaping bed is followed by a second bed formed of flexible rolls having a constant curvature on which the curved sheet is supported and subjected to a tempering and or cooling procedure. Means is also provided for driving the rolls of the shaping bed and the rolls of the second bed to move the glass sheets forwardly at a constant speed.

21 Claims, 14 Drawing Figures

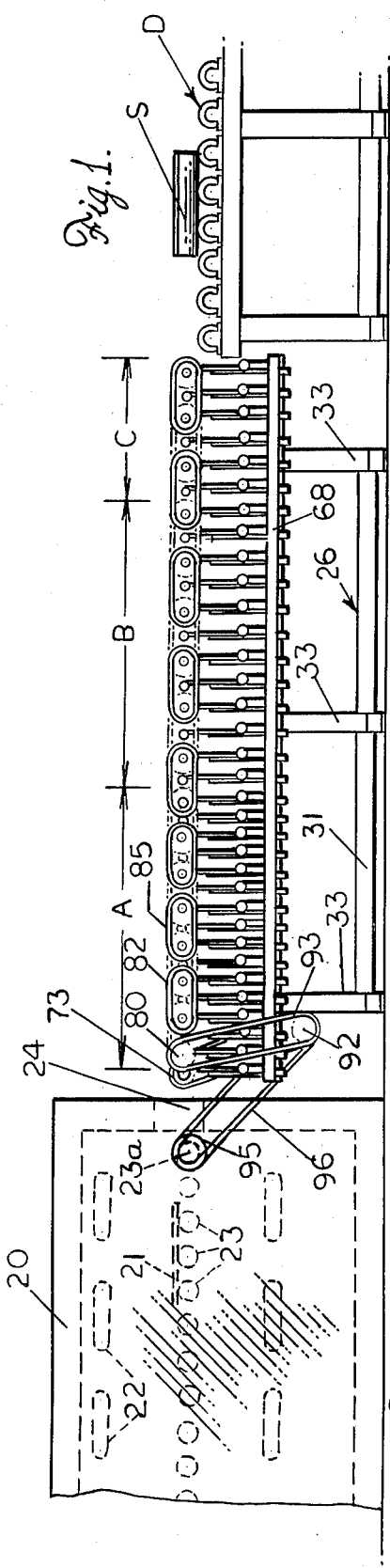

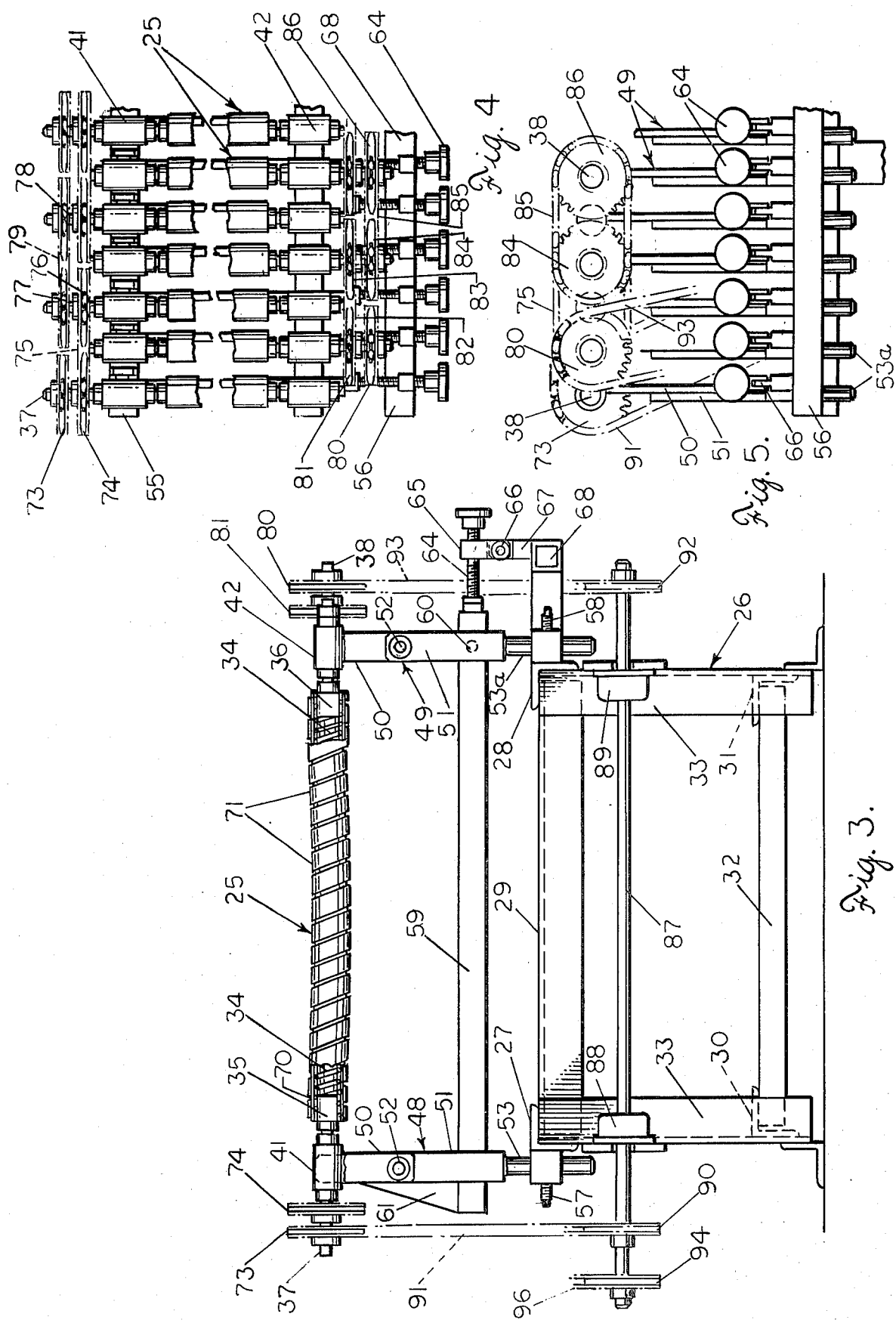

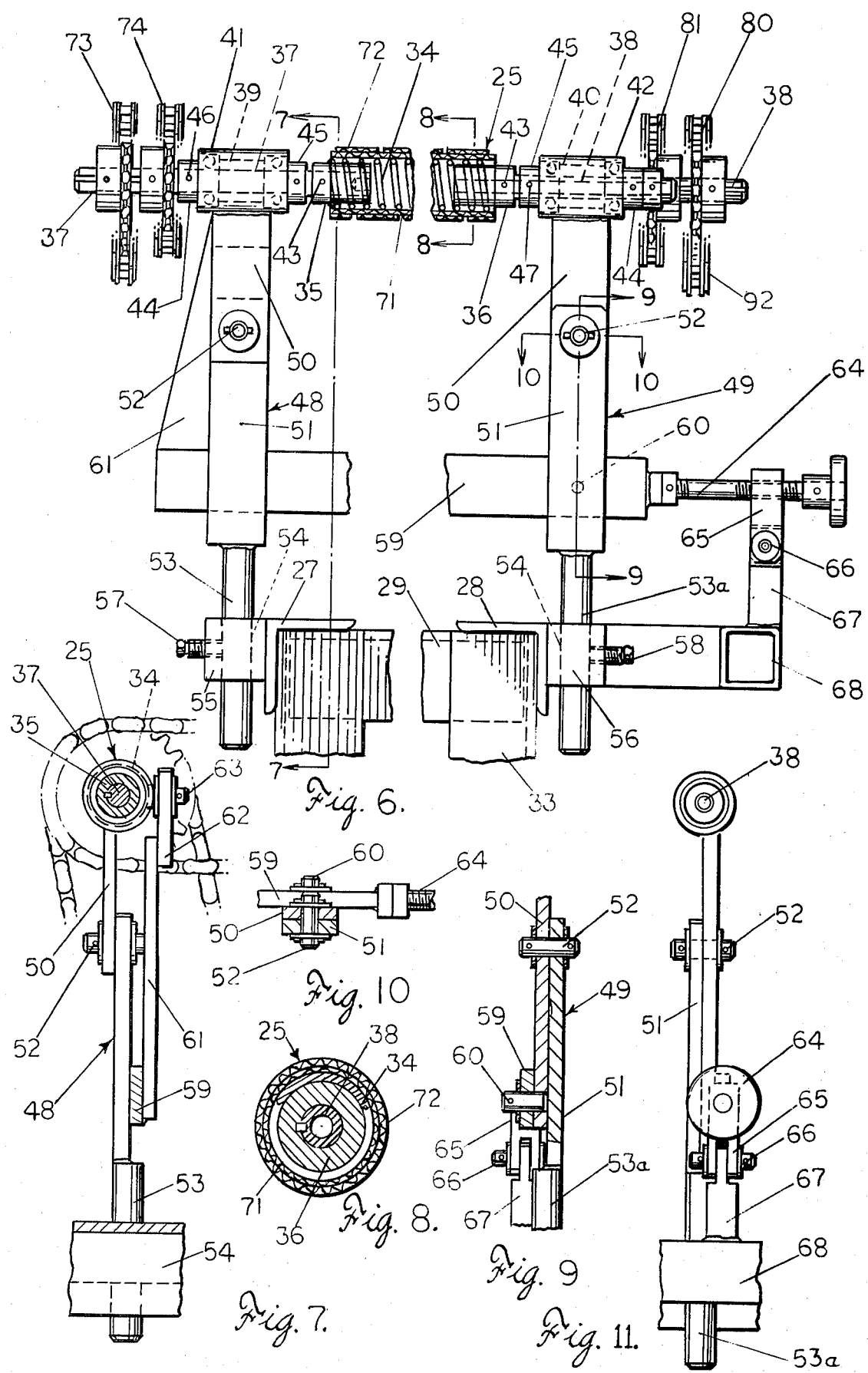

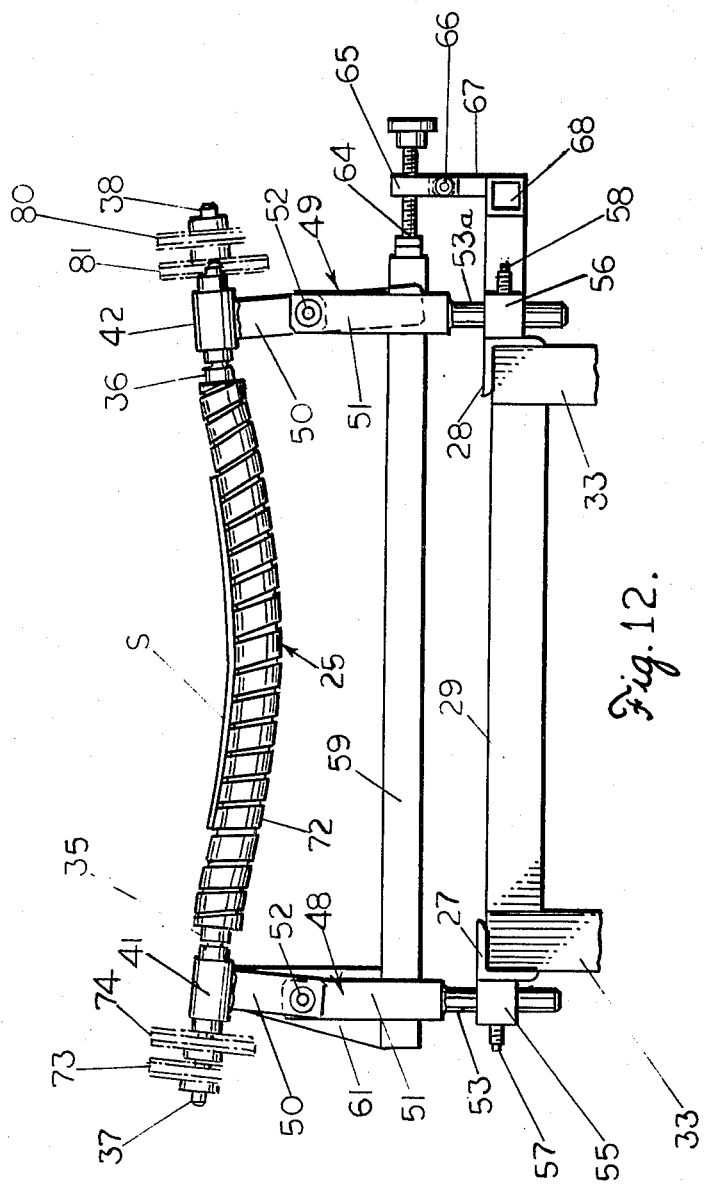

METHOD AND APPARATUS FOR CURVING GLASS SHEETS

SUMMARY OF THE INVENTION

The present invention relates to an improved method and apparatus for curving sheets of glass that have been brought to softening temperature.

Although the invention is of utility in the production of bent glass sheets in a wide range of curvatures and for a variety of uses it is of particular importance in the shaping of automobile windows and sidelights.

An important object of the invention is to provide a method and apparatus in which the softened glass sheets, as they emerge from a heating furnace, are curved to a selected arcuate form and tempered and cooled in a continuous, straight-line operation.

Another object of the invention is to provide a method and apparatus in which the initially flat glass sheets are gradually and progressively shaped to the desired degree of curvature under their own weight while being advanced continuously forward.

Another object of the invention is to provide an apparatus in which the means for shaping the glass sheets comprises a series of horizontally disposed flexible rolls for simultaneously curving and advancing the sheets forwardly, and in which means is provided for independently adjusting the rolls such that they can be used to provide sheets of glass having different degrees of curvature simply by varying the relative degrees of curvature of the shaping rolls.

A further object of the invention is to provide an apparatus of the above character including a curved bed formed of a series of shaping rolls, each roll comprising a relatively tightly wound coil spring, and means for independently adjusting the coil springs such that each succeeding coil spring in said bed is of a slightly greater degree of curvature than the preceeding coil spring, with the curvature of the last coil spring of said bed corresponding to the final curvature to be given the glass sheet.

A further object of the invention is to provide an apparatus of the above character which, when desired, may be used to temper flat sheets of glass.

Other details, objects and advantages of the invention will become apparent during the following description of the preferred embodiment taken in connection with the accompanying drawings.

BRIEF DESCRIPTION OF THE DRAWINGS

FIG. 1 is a side elevation of apparatus for bending glass sheets constructed in accordance with the present invention, FIG. 2 is a plan view of the apparatus, FIG. 3 is an end view of the shaping section of the apparatus, FIG. 4 is a plan view of several shaping roll assemblies, FIG. 5 is an end view of the shaping roll assemblies of FIG. 4, FIG. 6 is a side view of the supporting structure for the shaping roll assemblies, FIG. 7 is a transverse vertical section taken substantially on line 7—7 of FIG. 6, FIG. 8 is a vertical transverse section taken substantially on line 8—8 of FIG. 6, FIG. 9 is a vertical transverse section taken substantially on line 9—9 of FIG. 6, FIG. 10 is a horizontal section taken substantially on line 10—10 of FIG. 6, FIG. 11 is an end view of FIG. 6, FIG. 12 is an end view of one of the shaping roll assemblies similar to FIG. 3 but showing the shaping roll in a position to support a curved sheet of glass.

DESCRIPTION OF THE PREFERRED EMBODIMENT

Figure 13:
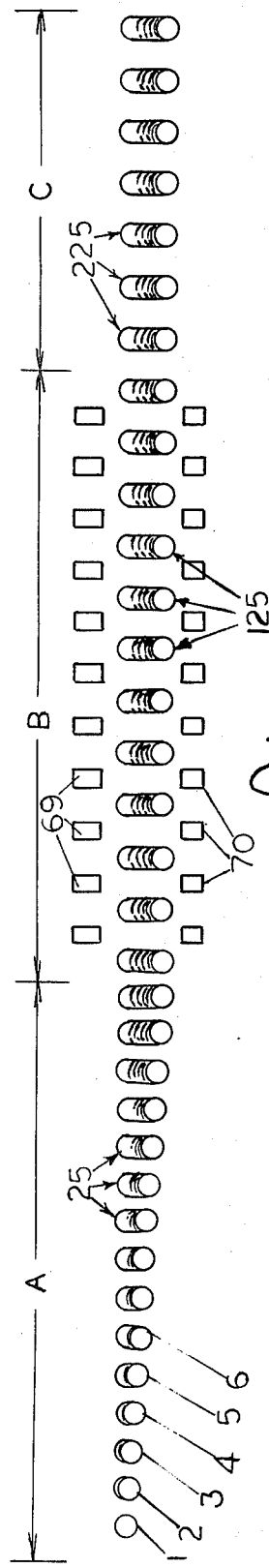
FIG. 13 is a diagrammatic, longitudinal sectional view through the apparatus, including a shaping or curving section, a tempering or cooling section and a run-out section.

Referring now to the drawings and particularly to FIGS. 1 and 13, there is shown a heating furnace 20 in which the initially flat sheets of glass 21 are heated to the softening temperature. The furnace can be heated in any desired manner such as by gas or electric heaters 22, the glass sheets being supported and conveyed through the furnace upon a series of horizontally spaced cylindrical rollers 23 driven in rotation by any preferred means.

The heated glass sheets emerge from the furnace through an opening 24 in the end wall thereof and pass to the sheet shaping zone or section of the apparatus, the longitudinal extent of which is indicated by the dimension A. As the sheets pass through the shaping zone they are bent to the desired degree of curvature. The curved sheets S then pass to and through a cooling zone or section indicated by the dimension B, the cooling operation being preferably carried out rapidly by means of air jets to subject the glass sheets to a thermal tempering step. From the cooling zone the curved and tempered glass sheets advance to the run-out conveyor section indicated by the dimension C and from which the glass sheets can be removed onto a roller-type table D for further handling.

The shaping section A of the apparatus comprises a plurality of flexible shaping rolls 25 arranged in horizontally spaced relation and extending parallel with the furnace rollers 23. The flexible shaping rolls 25 are mounted upon a supporting framework shown in FIGS. 1 and 3 and designated in its entirety by the numeral 26. This framework includes spaced upper longitudinally disposed angle members 27 and 28 connected by transverse angle members 29. A pair of similar longitudinally disposed angle members 30 and 31 are positioned beneath and parallel with the upper angle members 27 and 28 and are connected by transverse angle members 32. Vertical support posts 33 joined to the longitudinally extending upper and lower angle members 27–30 and 28–31 complete the supporting framework.

The flexible shaping rolls 25 are carried by the supporting framework 26, with each roll comprising a relatively tightly wound coil spring 34 (FIGS. 3 and 6) in the opposite ends of which are inserted bushings 35 and 36 to which the coil spring is secured, such as by welding. Received within the bushings 35 and 36 are the inner end portions of stub shafts 37 and 38, the outer end portions of which are journaled in bearings 39 and 40 contained in bearing housings 41 and 42 respectively. The bushings 35 and 36 are keyed to the stub shafts 37 and 38 respectively by set screws 43. Received on each stub shaft 37 and 38 at opposite ends of and abutting the respective bearing housing 41 and 42 are collars 44 and 45 secured to the stub shafts by set screws 46 and 47.

Each of the flexible shaping rolls 25 is supported at its opposite ends by upright bars 48 and 49 (FIGS. 3 and 6), each of which includes an upper arm 50 and a lower arm 51, said arms overlapping one another and pivotally connected by a horizontal hinge pin 52 passing therethrough. The upper arms 50 of the bars 48 and 49 are fixedly secured at their upper ends to the bearing housings 41 and 42 respectively, while the lower arms 51 of the bars terminate in vertical depending posts 53 and 53a which are received through openings 54 in the elongated horizontal beams 55 and 56 respectively carried by the horizontal angle members 27 and 28 respectively of the supporting framework 26 (FIG. 3). The posts 53 and 53a can be raised and lowered relative to the beams 55 and 56 to bring the bearing housings 41 and 42 into horizontal alignment with one another as well as to properly position the several shaping rolls with respect to one another. The posts 53 and 53a are secured in adjusted position by set screws 57 and 58 respectively.

The apparatus includes means for independently adjusting successive shaping rolls 25 to preselected curvatures of gradually increasing arcuate form which determine the final curved shape of the glass sheet. This is accomplished by providing means for adjusting the upper arms 50 of the upright bars 48 and 49 toward or away from one another which will move the bearing housings 41 and 42 inwardly or outwardly and simultaneously vary the angularity thereof. These combined movements of the bearing housings will flex the related coil springs 35 to cause them to assume a preselected curvature.

To this end, there is provided for each shaping roll assembly a horizontal operating link 59 (FIGS. 6 and 12) pivotally connected adjacent one end as at 60 to the lower end of arm 50 of upright bar 49. The link extends beyond the upright bar 48 and is fixed to a vertical arm 61 having an offset portion 62 (FIG. 7) at its upper end which is pivotally connected to the bearing housing 41 as at 63. Attached to the free end of the horizontal link 59 is a thumb screw 64 threaded through the upper end of a member 65 pivoted as at 66 to a bracket 67 mounted on a horizontal beam 68 carried by the supporting framework 26.

As shown diagrammatically in FIG. 13, the shaping rolls 25 in shaping section A are adapted to be adjusted to form a profile of gradually increasing curvature from left to right depending upon the final curved shape to be given the glass sheet. As pointed out above, this is accomplished by moving the bearing housings 41 and 42 of each roll 25 toward or away from one another to flex the coil spring 34. More particularly, as the thumb screw 64 is turned to move the horizontal link 59 to the right in FIG. 12, the upper arm 50 of upright bar 48 will swing inwardly about hinge pin 52 to move the bearing housing 41 inwardly and downwardly at an angle to the horizontal. Simultaneously therewith, the upper arm 50 of upright bar 49 will pivot inwardly about its related hinge pin 52 to also move the bearing housing 42 inwardly and angularly downward. The combined movements of the bearing housings will cause the stub shafts 37 and 38 to exert a pressure upon the opposite ends of the coil spring 34 to cause it to form a predetermined curved concave shape as shown in FIG. 12.

When the thumb screw 64 is turned in the opposite direction to move the horizontal link 59 to the left, the movement of the bearing housings 41 and 42 will be reversed to increase the tension on the coil spring 34 and thereby reduce the degree of curvature thereof as in FIG. 3. Thus by threading the thumb screws inwardly and outwardly the curvature of the coil springs can be independently varies as desired.

The rolls 25 in shaping zone A (FIG. 13) are individually adjusted so that the curvature of each succeeding roll is gradually increased from the first roll adjacent the furnace 20 to the last roll in said zone adjacent the cooling zone B, the curvature of said last roll determining the final curvature to be imparted to the glass sheet. The cooling zone B includes a second bed composed of a series of flexible rolls 125 for receiving the curved glass sheets S from the shaping rolls 25, with the rolls in said cooling zone possessing the same curvature as the last roll in shaping zone A. During forward movement of the glass sheets through the cooling zone B they will conform more completely to the curvature of the rolls. Also in zone B the curvature given the glass sheets is stabilized and preferably the sheets are rapidly cooled by jets of air applied to opposite surfaces thereof to temper the same. The jets of air can be supplied by any suitable means such as through slots or orifices formed in tubular ducts 69 and 70 which extend transversely above and beneath the path of travel of the glass sheets. To accommodate the jets of air the rolls 125 in the cooling zone B are spaced somewhat further apart than the rolls 25 in shaping zone A.

The run-out section C constitutes a third bed also composed of a series of horizontally spaced flexible rolls 225 which are of a constant curvature corresponding to the curvature of the rolls 125 of the cooling section. The rolls in the cooling section and run-out section are preferably of the same construction and adjustably supported in the same manner as the rolls 25 in the shaping section.

The coil springs 34 of the rolls 25, 125 and 225 are formed of closely wound spring steel wire of about 0.210 inch diameter. The overall diameter of the coil spring is about one and one-half inches, with the length thereof depending upon the size of the glass sheets to be curved. The coil springs are enclosed in flexible tubular sleeves 71 of a suitable fabric, said sleeves being preferably secured to said coil springs by a coating of air setting high temperature silicone and around which is wound a length of fiber glass tape 72. If desired, the fabric sleeves may be omitted and the fiber glass tape wound directly around the coil springs.

According to the invention, all of the rolls in the shaping section A, cooling section B and run-out section C are driven in rotation at a constant speed from a common main source of power. In view of the close proximity of the shaping rolls 25, the odd-numbered rolls 1, 3, 5 etc. (FIG. 13) are driven from one end and the even-numbered rolls 2, 4, 6 etc. are driven from the other end. Thus the driving means for alternate rolls are staggered at opposite sides of the apparatus. Considering first the drive means for the rolls 1, 3, 5 etc. the stub shaft 37 of roll 1 is provided with two sprockets 73 and 74, the sprocket 73 being driven from the main source of power to be later described. The sprocket 74 drives through a sprocket chain 75 a sprocket 76 on the shaft 37 of roll 3. A second sprocket 77 on the shaft of roll 3 drives a sprocket 78 on the shaft of roll 5 through a sprocket chain 79. This double sprocket and chain drive arrangement is continued for effecting the rotation of the remaining alternate rolls in the shaping section as well as the alternate rolls 125 in the cooling section and the alternate rolls 225 in the run-out section.

The means for driving the even-numbered rolls 2, 4, 6, etc. in the shaping section is substantially the same as explained above for the odd-numbered rolls. The stub shaft 38 of the first even-numbered roll 2 is provided with two sprockets 80 and 81, the sprocket 80 being connected to the main source of power, while sprocket 81 drives through a sprocket chain 82 a sprocket 83 on the shaft 38 of roll 4, said shaft being provided with a second sprocket 84 which drives through a sprocket chain 85 a sprocket 86 on the shaft of roll 6. This chain and sprocket drive arrangement is also continued for the remaining even-numbered rolls in the shaping section as well as for the alternate rolls in the cooling section and run-out section.

As noted above, all of the rolls are driven from a common main source of power and more particularly from the last furnace roller 23a. For this purpose and with particular reference to FIGS. 1 and 3, there is provided a horizontal transverse shaft 87 journaled in bearings 88 and 89 carried by the supporting framework 26 and extending therebeyond at both ends. Keyed to one end of the shaft 87 is a sprocket 90 driven by a sprocket chain 91 from the sprocket 73 on the shaft 37 of the first shaping roll. Keyed to the opposite end of shaft 87 is a sprocket 92 driving the sprocket 80 on stub shaft 38 of the second shaping roll through a sprocket chain 93. Also keyed to the shaft 87 is a sprocket 84 which is driven from a sprocket 95 on the last furnace roller 23a through a sprocket chain 96.

OPERATION OF THE APPARATUS

In the operation of the apparatus, the flexible rolls 25 in shaping section A are first adjusted to the desired curved form by the means described above, with each succeeding roll being of a slightly greater curvature than the preceding roll and with the curvature of the last roll in said section corresponding to the final curvature to be given the glass sheet. As the softened glass sheets emerge from the furnace and advance over the shaping rolls 25 they will sag under their own weight and gradually assume the arcuate concave form of the succeeding rolls until they reach the last shaping roll which determines the final degree of curvature of the glass sheet.

As the curved glass sheets S leave the shaping rolls 25 and advance over the rolls 125 of cooling section B the curvature of the sheets is stabilized and also cooled or tempered, as desired. The curved glass sheets then pass onto the rolls 225 of the run-out section C from which they can be removed for further processing. Once the shaping rolls have been adjusted to obtain sheets of the desired curvature and the rolls in the cooling and run-out sections correspondingly adjusted to the last shaping roll, as many sheets of glass as desired can be successively bent without further adjustment of the apparatus. When the coil springs 34 are initially installed in the apparatus they are placed under a predetermined tension so that the coils are spaced about one inch apart. This permits the desired flexing of the springs without binding of the coils.

TEMPERING OF FLAT SHEETS OF GLASS

Although the apparatus herein provided is particularly adapted for the curving and tempering of initially flat sheets of glass, it is also of utility in the tempering of the flat glass sheets as the emerge from the furnace. When this is desired the shaping rolls 25 as well as the rolls 125 in the cooling section and the rolls 225 in the run-out section are all adjusted to assume a horizontal position in alignment with one another. This can be achieved by turning the thumb screws 64 to move the upper arms 50 of the upright bars 48 and 49 to bring the bearing housings 41 and 42, and the related stub shafts 37 and 38, into horizontal alignment with one another as shown in FIG. 3. However, it has been found that, due to the normal resiliency of the coil springs 34 there is a tendency for the springs to sag slightly so that adjustment of the stub shafts alone into horizontal alignment will not bring the coil springs into a strictly horizontal position.

Figure 14:
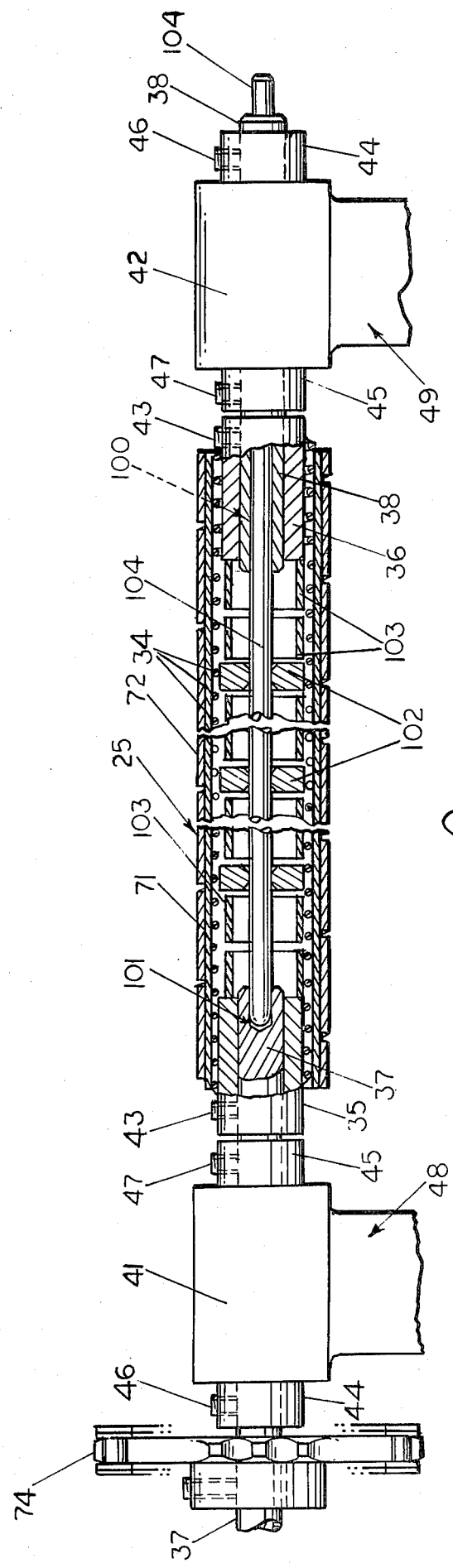
FIG. 14 is a longitudinal section through one of the shaping rolls including means for straightening the roll when it is desired to temper flat sheets of glass.

In order to overcome this normal sag in the coil springs there is provided the novel design of roll illustrated in FIG. 14. As shown therein, the stub shaft 38 of the roll is provided with a bore 100 extending therethrough, while the stub shaft 37 is provided in its inner end with a socket 101. Received in the coil springs 34 are three spaced bushings 102, preferably of metal, which snugly fit the interior of the coil spring but are not attached thereto. Also located in the coil spring between and at opposite sides of the bushings 102 are sleeves 103, preferably formed of thin walled aluminum tubing. The diameter of these sleeves is relatively less than the interior diameter of the coil spring so that they, in effect, float therein during rotation of the roll. It has been found that these sleeves tend to stabilize the coil spring so that it can be accurately adjusted to and maintained in its preselected curved form. The bushings 102 and sleeves 103 are inserted in the coil spring prior to the spring being secured at its ends to the bushings 35 and 36. The bushings and sleeves are also maintained slightly spaced so as not to bind against one another during adjustment and rotation of the rolls.

When it is desired to temper the softened flat sheets of glass upon leaving the furnace, the bearing housings 41 and 42 are adjusted to bring the coil spring as close as possible to a horizontal position. A rigid rod 104, preferably of metal, is then inserted through the bore 100 in the stub shaft 38 (FIG. 14) and also through the bushings 102 and sleeves 103, with the inner end of said rod being received in the socket 101 in the inner end of of stub shaft 37. The rod 104 is preferably about three-eighths inch diameter and snugly fits the openings in the bushings 102. When the rod is inserted in the coil spring in this manner it will act to straighten the coil spring into a precise horizontal position and thereby remove the normal sag therein. The bushings 102 are preferably bevelled around the openings therein to facilitate the insertion of the rod therethrough. It is preferred that the rods be inserted through the stub shafts 37 and 38 at the non-driven ends of the rolls. The rolls 125 in cooling section B and the rolls 225 in the run-out section C are similarly constructed so that they can also be moved into a horizontal position in alignment with the rolls 25 to receive the flat glass sheets therefrom.

While there has been illustrated and described a preferred embodiment of the invention, it will be understood that changes and modifications may be made without departing from the spirit and scope of the claims.

I claim:

1. Apparatus for curving glass sheets brought to a softening temperature, comprising a series of horizontally spaced flexible shaping rolls forming a curved concave bed for receiving the softened glass sheets, end sections for supporting the rolls at their opposite ends, means for driving the rolls in rotation to move the glass sheets forwardly thereover, and means for moving said end sections inwardly and angularly downward toward one another to apply end pressure to the opposite end of the said rolls to cause said rolls to assume a predetermined concave curvature.

2. Apparatus as claimed in claim 1, including means for independently moving the end sections of each roll inwardly and angularly downward toward one another to apply a gradually increasing pressure to succeeding rolls in said bed to bend the rolls to progressively increasing degrees of concave curvature from the first roll to the last roll of said bed.

3. Apparatus as claimed in claim 1, in which said rolls each comprise a flexible coil spring, and in which said end sections apply pressure to the opposite ends of the coil spring to bend the same to a predetermined concave curvature.

4. Apparatus as claimed in claim 2, in which said rolls each comprise a flexible coil spring, and in which said end sections apply pressure to the opposite ends of the coil spring to bend the same to a predetermined concave curvature.

5. Apparatus as claimed in claim 1, including means for pivotally mounting said end sections, and means for simultaneously swinging the said end sections of each roll inwardly and angularly downward toward one another about their pivots to apply end pressure to the roll to bend the same to a predetermined concave curvature.

6. Apparatus as claimed in claim 1, in which the shaping rolls each comprise a flexible coil spring, and including means for pivotally mounting said end sections, and means for simultaneously swinging the end sections of each roll inwardly and downwardly toward one another about their pivots to apply end pressure to the opposite ends of the coil spring to bend the same to a predetermined concave curvature.

7. Apparatus as claimed in claim 1, in which said end sections include stub shafts provided at the opposite ends of each roll and bearing housings in which said stub shafts are journaled, and including means for pivotally supporting said bearing housings, means for actuating said pivotal supporting means to move the bearing housings inwardly and downwardly at an angle to the horizontal to apply pressure to the opposite ends of said stub shafts to bend the flexible roll to a predetermined concave curvature, and means for driving said stub shafts in rotation to advance the glass sheets over said rolls.

8. Apparatus as claimed in claim 7, in which said rolls are independently adjustable to apply a gradually increasing pressure on succeeding rolls to bend the rolls to progressively increasing degrees of concave curvature from the first roll to the last roll of said shaping bed.

9. Apparatus as claimed in claim 7, in which each shaping roll comprises a flexible coil spring, and in which the stub shafts apply pressure to the opposite ends of said coil spring.

10. Apparatus as claimed in claim 7, in which the means for pivotally supporting said bearing housings includes a pair of upright bars, each comprising an upper arm secured at its upper end to the related bearing housing and a fixed lower arm, means for pivotally connecting said upper and lower arms together, and operating means for swinging the upper arms of said upright bars inwardly toward one another to move the bearing housings inwardly and downwardly to at angle to the horizontal to apply pressure to the opposite ends of the roll to bend the same to a predetermined concave curvature.

11. Apparatus as claimed in claim 10, in which the shaping rolls each comprise a flexible coil spring, and in which the pressure is applied by said bearing housings to the opposite ends of the coil spring.

12. Apparatus as claimed in claim 1, including a series of horizontally spaced flexible rolls forming a curved sheet cooling bed for receiving the curved sheet from the shaping bed and in which the rolls of the sheet cooling bed are provided with a constant concave curvature corresponding to that of the last roll of the shaping bed, and means for driving the rolls of the shaping bed and cooling bed in rotation at a constant speed.

13. Apparatus as claimed in claim 12, including a series of horizontally spaced flexible rolls forming a curved run-out bed for receivng the curved glass sheets from the sheet cooling bed, and means for driving the rolls of said shaping bed, cooling bed and run-out bed at a constant uniform speed.

14. Apparatus as claimed in claim 3, including a plurality of bushings located in said coil spring in spaced relation to one another and snugly fitting the interior thereof, means for supporting the coil spring including stub shafts received in the opposite ends thereof, one stub shaft having a bore extending therethrough and the other stub shaft being provided with a socket in its inner end, and a rigid rod adapted to be inserted through the bore in the first stub shaft and having its inner end received in the socket in the second stub shaft, said rod also passing through the bushings located in the coil spring.

15. Apparatus as claimed in claim 14, including a plurality of hollow sleeves located in said coil spring between and at opposite sides of the bushings and through which said rigid rod also passes, said sleeves being of a diameter relatively less than the interior diameter of said coil spring and adapted to float therein upon rotation of said spring.

16. Apparatus for curving glass sheets brought to a softening temperature, comprising a series of horizontally spaced flexible shaping rolls forming a curved concave bed for receiving the softened glass sheets, means for supporting the rolls at their opposite ends, means for driving the rolls in rotation to move the glass sheets forwardly thereover, and means for applying pressure to the opposite ends of the rolls to cause said rolls to assume a predetermined concave curvature.

17. Apparatus as claimed in claim 16, including means for independently applying a gradually increasing pressure to the opposite ends of succeeding rolls in said bed to bend the rolls to progressively increasing degrees of concave curvature from the first roll to the last roll in said bed.

18. Apparatus as claimed in claim 16, in which said rolls each comprises a flexible coil spring, and in which the pressure is applied to the opposite ends of the coil spring to bend the same to a predetermined curvature.

19. Apparatus as claimed in claim 17, in which said rolls each comprises a flexible coil spring, and in which the pressure is applied to the opposite ends of the coil spring to bend the same to a predetermined curvature.

20. A method of bending heat softened sheets of glass to a predetermined curvature, which comprises conveying the softened glass sheets horizontally in a longitudinal direction over a shaping bed composed of a series of flexible shaping rolls of progressively increasing degrees of concave curvature in the direction of movement of the glass sheets and upon which said glass sheets sag under their own weight to gradually assume the final curved shape, and independently varying the relative degrees of concave curvature of succeeding shaping rolls in said bed by the application of pressure to the opposite ends of the said rolls to alter the concave profile of the shaping bed and thus the final curved shape of the glass sheets.

21. A method of bending heat softened sheets of glass to a predetermined curvature as claimed in claim 20, wherein a gradually increasing pressure is applied to the opposite ends of succeeding rolls in said bed to bend the rolls to progressively increasing degrees of concave curvature from the first roll to the last roll of said bed.

* * * * *